(12) United States Patent
Yoshimura et al.

(10) Patent No.: US 9,379,402 B2
(45) Date of Patent: Jun. 28, 2016

(54) ANION CONDUCTING ELECTROLYTE MEMBRANE AND MANUFACTURING METHOD THEREOF

(71) Applicants: Japan Atomic Energy Agency, Ibaraki (JP); Daihatsu Motor Co., Ltd., Osaka (JP)

(72) Inventors: Kimio Yoshimura, Takasaki (JP); Hiroshi Koshikawa, Takasaki (JP); Tetsuya Yamaki, Takasaki (JP); Masaharu Asano, Takasaki (JP); Yasunari Maekawa, Takasaki (JP); Hideyuki Shishitani, Shiga (JP); Hirohisa Tanaka, Shiga (JP); Susumu Yamaguchi, Shiga (JP); Koichiro Asazawa, Shiga (JP); Kazuya Yamamoto, Shiga (JP); Fumihiro Sanpei, Shiga (JP)

(73) Assignees: Japan Atomic Energy Agency, Ibaraki (JP); Daihatsu Motor Co., Ltd., Osaka (JP)

( * ) Notice: Subject to any disclaimer, the term of this patent is extended or adjusted under 35 U.S.C. 154(b) by 345 days.

(21) Appl. No.: 13/785,919

(22) Filed: Mar. 5, 2013

(65) Prior Publication Data
US 2013/0280626 A1    Oct. 24, 2013

(30) Foreign Application Priority Data
Mar. 7, 2012    (JP) .................................. 2012-049960

(51) Int. Cl.
*H01M 8/10*    (2016.01)

(52) U.S. Cl.
CPC .......... *H01M 8/1018* (2013.01); *H01M 8/1088* (2013.01); *Y02E 60/521* (2013.01); *Y02P 70/56* (2015.11)

(58) Field of Classification Search
CPC .................... H01M 2300/0082; H01M 8/1023
USPC ........................................................... 429/408
See application file for complete search history.

(56) References Cited

U.S. PATENT DOCUMENTS

| | | | | |
|---|---|---|---|---|
| 5,648,400 | A | * | 7/1997 | Sugo .................. B01J 43/00 521/27 |
| 2002/0127474 | A1 | * | 9/2002 | Fleischer ............. B01D 53/228 429/309 |
| 2006/0057465 | A1 | * | 3/2006 | Ogata et al. .................... 429/309 |

FOREIGN PATENT DOCUMENTS

| | | |
|---|---|---|
| EP | 0913422 A2 * | 10/1998 |
| JP | 2000-331693 | 11/2000 |
| JP | 2002-367626 | 12/2002 |
| JP | 2009-203455 | 9/2009 |
| JP | 2010-092660 | 4/2010 |
| JP | 2011-202074 | 10/2011 |

* cited by examiner

*Primary Examiner* — Stewart Fraser
*Assistant Examiner* — Olatunji Godo
(74) *Attorney, Agent, or Firm* — Brundidge & Stanger, P.C.

(57) ABSTRACT

An anion conducting electrolyte membrane with high performance where the electric conductivity and the water uptake are balanced, and a method of manufacturing the same are disclosed. The anion conducting electrolyte membrane comprises: a polymeric material which consists of fluorine polymer, olefinic polymer, or aromatic polymer; weak base quaternary salt obtained by the reaction of grafts introduced by graft polymerizing vinyl monomer which contains halogenated alkyl groups using radiation and strong organic bases.

6 Claims, 3 Drawing Sheets

1. BASE POLYMER
2. GRAFT POLYMER
3. QUATERNARY AMMONIUM SALT

1. BASE POLYMER
2. GRAFT POLYMER
3. QUATERNARY AMMONIUM SALT

ANION CONDUCTING ELECTROLYTE MEMBRANE AND MANUFACTURING METHOD THEREOF

BACKGROUND OF THE INVENTION

The present invention relates to an anion conducting electrolyte membrane used in a solid polymer electrolyte type fuel cell, etc. and a manufacturing method thereof. In particular, the present invention relates to an anion conducting electrolyte membrane of low water uptake and high conductivity and a manufacturing method thereof, in which at least one part of grafts with halogenated alkyl groups has been converted into quaternary ammonium salt, which are introduced into a polymeric material comprised of a fluorine polymer for example.

Because the generating efficiency of the proton conducting fuel cell which uses hydrogen as a fuel is high, it may become a promising solution for the fossil fuel depletion. Moreover, because the carbon dioxide emissions can be greatly reduced in the proton conducting fuel cell, it also becomes the control means of global warming. Therefore, the development of the proton conducting fuel cell is hoped for domestic cogeneration and a power supply for cars. Especially, because a solid polymer type fuel cell uses the catalyst with high revitalization in addition to the low operation temperature and the low resistance of the electrolyte used, high power can be obtained even if it is small. Therefore, early implementation of the solid polymer type fuel cell is expected.

As for the anion conducting fuel cell which uses methanol or hydrazine as a fuel, the application to a fuel cell vehicle such as a compact car is especially advanced from simplicity of installing as the liquid fuel, high safety and high output density. Because the highly acidic condition is not needed in this proton conducting fuel cell when operating, cheaper iron or cobalt can be used as its electrodes, instead of precious metals such as platinum. Therefore, low-cost and high power fuel cell can be provided. However, it is a situation that the practical anion conducting electrolyte membrane is hardly developed. There is a major problem in that the conductivity, the mechanical strength, and the fuel permeability is remarkably low in a current anion conducting electrolyte membrane compared with time-proven Nafion® (a registered trademark of E.I. du Pont de Nemours & Co., Inc.) or the proton conducting electrolyte membrane.

In the anion type fuel cell, the anion conducting electrolyte membrane acts as so-called "electrolyte" to conduct the hydroxide ion (anion), and as "barrier membrane" to prevent methanol or hydrazine which is the fuel from mixing with oxygen. It is demanded as the polymer electrolyte membrane that the ionic conduction is large, chemical characteristics are stable so as to be tolerated in long-term use, the heat resistance is maintained for a long term at a temperature more than the operation temperature of the fuel, and the water holding property of the membrane is constant to keep ionic conduction high. On the other hand, it is demanded to have the excellent mechanical strength and dimensional stability of the membrane, and the high barrier characteristic to methanol, hydrazine, and oxygen from a viewpoint of the role as the barrier membrane.

The development of the anion conducting electrolyte membrane to solve said various problems has been actively advanced up to now. For example, the anion conducting electrolyte membrane, in which the anion exchange resin crosslinked is filled in the pores of a hydrocarbon film base material such as porous polyethylene is developed, and come on to the market (patent literatures 1-3). Moreover, a method of manufacturing the anion conducting electrolyte membrane, in which a basic material film made by polymerizing a mixture of haloalkyl styrene, elastomeric, and epoxy compounds is used, and the anion exchange groups are introduced by quaternization reaction is also presented (patent literature 4). Another method of manufacturing the anion conducting electrolyte membrane, in which the anion exchange groups are introduced after graft polymerizing the monomer which contains the groups on which the anion exchange groups can be introduced with the basic material comprised of fluorine polymer by radiation is also disclosed (patent literature 5).
Patent literature 1: JP 2002-367626 A1
Patent literature 2: JP 2009-203455 A1
Patent literature 3: JP 2010-092660 A1
Patent literature 4: JP 2011-202074 A1
Patent literature 5: JP 2000-331693 A1

BRIEF SUMMARY OF THE INVENTION

However, any anion membrane tends for water uptake to rise, because the anion exchange groups consist of the alkylammonium salt obtained by quaternization of alkyl amines such as trimethylamines. It is necessary to suppress the water uptake to low at the same time as making the anion membrane to the high conductivity, because the possibility that the main body of the fuel cell is destroyed may come out when the water uptake is high even if the electric conductivity is improved by quaternization as described later.

Therefore, an object of the present invention is to provide an anion conducting electrolyte membrane with high electric conductivity where the electric conductivity and the water uptake are balanced, and a method of manufacturing thereof.

According to one aspect of the present invention, the anion conducting electrolyte membrane of the present invention comprises: a polymeric material which consists of fluorine polymer, olefinic polymer, or aromatic polymer; quaternary salt obtained by the reaction of grafts introduced by graft-polymerizing vinyl monomer which contains halogenated alkyl groups using radiation and strong organic bases.

According to another aspect of the present invention, a method of manufacturing an anion conducting electrolyte membrane comprising the steps of: graft-polymerizing vinyl monomer which contains the halogenated alkyl groups on a polymeric material which consists of fluorine polymer, olefinic polymer or aromatic polymer using radiation; quaternizing at least one part of the grafts on the polymeric material introduced by the radiation graft polymerization with a strong organic base; and substituting halogen anions of the quaternized grafts with hydroxide ions.

According to a further aspect of the present invention, an anion conducting electrolyte membrane with high conductivity and low water uptake is obtained from stable weak acid-weak base combination, consisting of hydroxide ion which is the weakest acid and weak base quaternary ammonium by;

introducing graft which contains halogenated alkyl groups into the polymeric material which consists of fluorine polymer, olefinic polymer or aromatic polymer, having excellent mechanical property and chemical stability at high temperatures, by the radiation graft polymerization, and by the reaction of various amines with high basicity (strong organic base) and alkyl halide parts.

Effects of the Invention

By setting the weak base quaternary ammonium salts as anion exchange groups in the present invention, the salts of the stable combination of the weak acid and the weak base are formed between the quaternary ammonium salt and the hydroxide ions which is the weakest acid on the anion conducting electrolyte membrane. In addition, the anion conducting electrolyte membrane with the high performance where the electric conductivity and the water uptake are balance can be realize by controlling the basicity of the quaternary ammonium salt by means of the quaternization reaction which uses various strong organic bases.

Moreover, as for the grafts which has the halogenated alkyl groups added by the radiation graft polymerization, the introduction amount can be changed easily according to the irradiation time of the radiation or the graft polymerization time. Therefore, the kind or the introduction amount of the quaternary ammonium salt can be adjusted to an arbitrary value though it is difficult in the conventional method so far.

Various problems in the conventional anion conducting polymer type fuel cell, which are caused by high water uptake of the anion conducting electrolyte film can be solved according to the present invention.

DETAILED DESCRIPTION OF THE INVENTION

Figure 1:
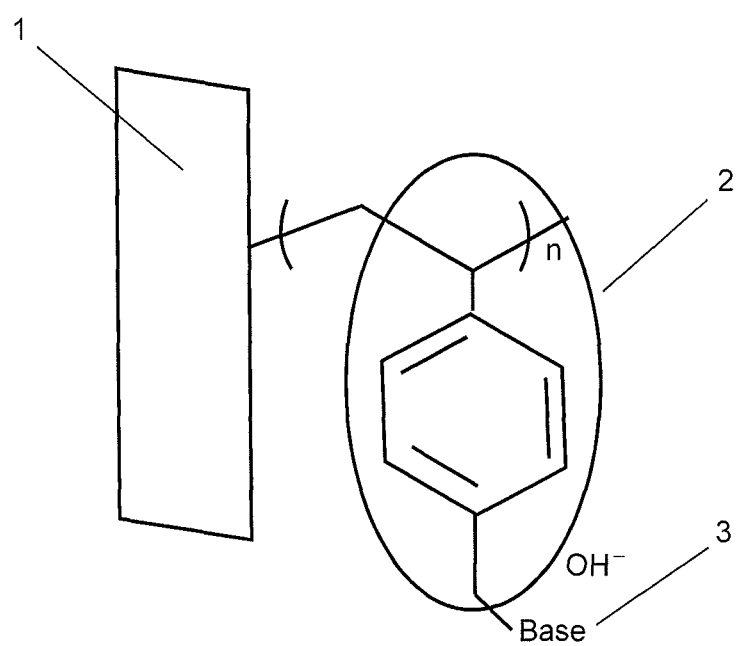
FIG. 1 is a schematic view showing the relationship among base polymer, graft polymer, and quaternary ammonium salt in the anion conducting electrolyte membrane of the present invention.
Figure 2A:
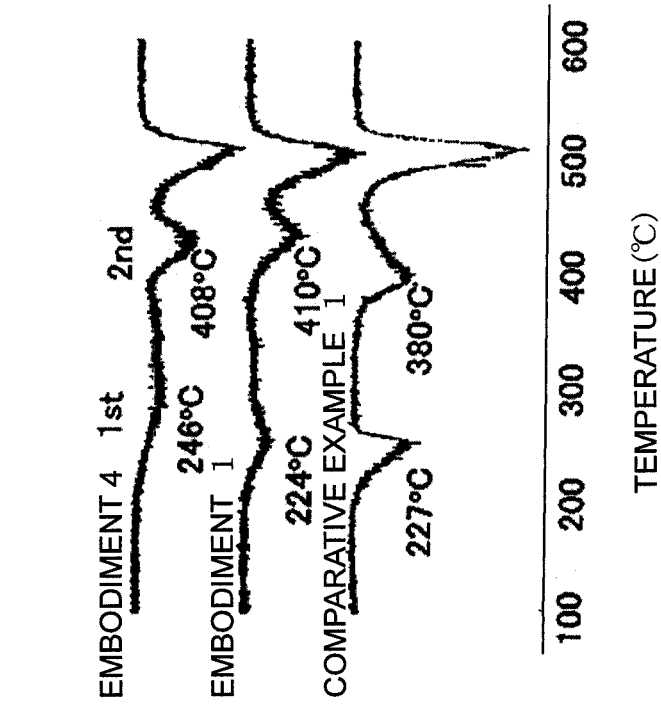
FIGS. 2A and 2B show the results of thermo-gravimetric analysis in chloride form of embodiments 1, 4, and comparative example 1 of the present invention.
Figure 2B:
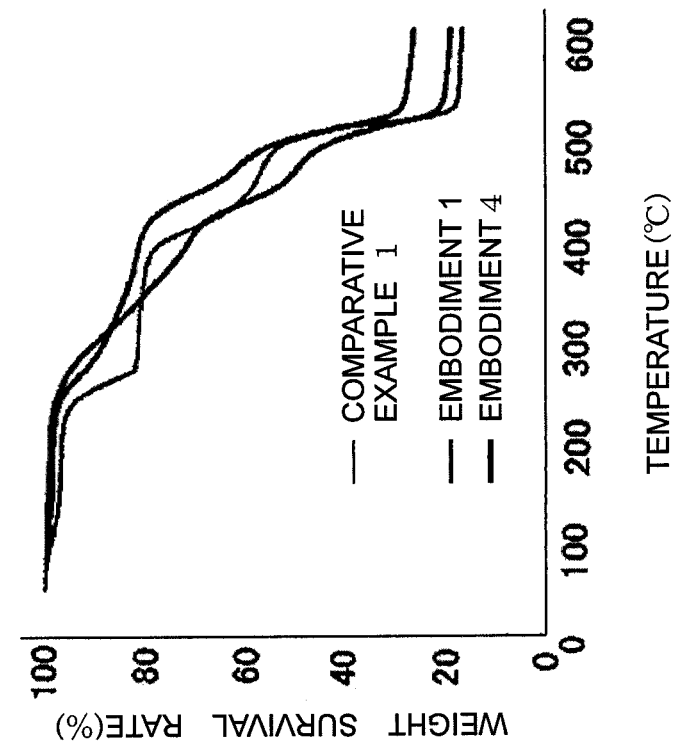

The anion conducting electrolyte membrane according to the present invention is manufactured basically by graft-polymerizing vinyl monomer which contains the halogenated alkyl groups on a polymeric material which consists of fluorine polymer, olefinic polymer or aromatic polymer using radiation; quaternizing at least one part of the grafts on the polymeric material introduced by the radiation graft polymerization with strong organic bases; and substituting halogen anions of the grafts being quaternized with hydroxide ions.

Fluorine polymer which can use as a polymer material in the present invention are: polytetrafluoroethylene (hereafter, abbreviated as PTFE), tetrafluoroethylene hexafluoropropylene copolymer (hereafter, abbreviated as FEP), tetrafluoroethylene perfluoroalkyl vinylether copolymer (hereafter, abbreviated as PFA), polyvinylidene fluoride (hereafter, abbreviated as PVDF), ethylene tetrafluoroethylene copolymer (hereafter, abbreviated as ETFE), polyvinyl fluoride (hereafter, abbreviated as PVF), and polychlorotrifluoroethylene copolymer (hereafter, abbreviated as ECTFE). Moreover, the heat resistance and the swelling suppressibility of the electrolyte membrane can be improved further by crosslinking the fluorine polymer beforehand.

Preferably, the olefinic polymer which can be used as a polymeric material in the present invention is polymer in which a unit of the polymerization is polyethylene, polypropylene or trimethyl pentene of low density, high density, or ultrahigh molecular weight. Moreover, the heat resistance and the swelling suppressibility of the electrolyte membrane can be improved further by crosslinking the olefinic polymer beforehand.

Aromatic hydrocarbon polymer which can use as a polymer material in the present invention are: plastics called a high function resin (super-engineering plastic); polyimide; polyamide imide; polyetherimide; polyethylene naphthalate; liquid crystal aromatic polymer; polyether etherketone; polyphenylene oxide; polyphenylene sulfide; polysulfone; polyethersulfone. Moreover, the heat resistance and the swelling suppressibility of the electrolyte membrane can be improved further by crosslinking the aromatic hydrocarbon polymer beforehand.

A composite material of thermoplastic resin and various inorganic fillers or the polymer alloys can be used as a polymeric material to control the durability improvement and the swelling suppressibility of the anion conducting electrolyte membrane.

For example, styrene derivatives which have halogenated alkyl groups which forms the quaternary ammonium salt by means of the reaction with amine is introduced to said polymeric material by the radiation graft polymerization in the present invention. As a halogenated alkyl group of the styrene derivatives, chloromethyl group, chloroethyl group, alkyl chloride group having 1~6 carbon atoms such as chloropropyl group, bromomethyl group, bromoethyl group, alkyl bromide group having 1~6 carbon atoms such as bromo propyl group, iodine methyl group, ilodine ethyl group, alkyl iodide group having 1~6 carbon atoms such as iodine butyl are enumerated. Among such halogenated alkyl groups, the chloromethyl group is preferred.

When graft-polymerizing the styrene derivatives which have the halogenated alkyl groups, it may be used by mixing plural kind of monomers, and diluting them in the solvent. However, if 70 wt % or more of hydrocarbon vinyl monomer and/or fluorocarbon vinyl monomer are added, the content of the quaternary ammonium salt is decreased and the electric conductivity is also decreased. Therefore, less than 70 wt % addition is preferred.

Preferably, the hydrocarbon vinyl monomer is styrene, acrylonitrile, vinyl ketone, isobutene, butadiene, isoprene, acetylenes etc.

Preferably, the fluorocarbon vinyl monomer is heptafluoro propyl torifluoro vinylether, ethyl torifluoro vinylether, hexafluoropropene, perfluoro(propyl vinylether), pentafluoro ethyl torifluoro vinylether, perfluoro(4-methyl-3,6-dioxanon-1-ene), trifluoromethyl torifluoro vinylether, hexafluoro-1,3-butadiene.

The graft may be crosslinked by using the cross linking agent such as the polyfunctional monomer together with the vinyl monomer in the process of the radiation graft polymerization of the present invention. Preferably, polyfunctional monomer is bis(vinylphenyl)ethane; divinylbenzene; 2,4,6-triallyloxy; 3,5-triazine (triallyl cyanurate); triaryl 1; 2,4-benzene tori carboxylate (triallyl trimellitate); diallyl ether; bis(vinylphenyl)methane; divinyl ether; 1,5-hexadiene; butadiene.

Preferably, less than 20% cross linking agent in the weight ratio to the vinyl monomer is used. If 20% or more of cross linking agent is used, the polymer electrolyte membrane becomes fragile. The mechanical strength of the electrolyte membrane is improved because the chemical bond increases by crosslinking. Consequently, the transformation of the electrolyte membrane due to the wet swelling is reduced, and deterioration in the electrolyte membrane in the fuel cell operating state can be controlled.

In the radiation graft polymerization, it is desirable to irradiate 1~500 kGy to the polymeric material at the room temperature to 150° C. under the inert gas or oxygen existence. The grafting degree required to obtain enough electric conductivity cannot be obtained in case of 1 kGy or less radiation, and the polymeric material becomes fragile in case of 500 kGy or more.

The radiation graft polymerization can be carried out by a simultaneous irradiation method in which the vinyl monomer derivatives and the polymeric material are irradiated at the same time to form the graft polymerization, or by a preoperative irradiation method in which the polymeric material irradiated beforehand is brought in contact with the vinyl monomer derivatives to form the graft polymerization. However, pre-irradiation method is preferred because the formation of the homo-polymer is few. Both can be used though the pre-operative irradiation method includes a polymer radical method in which the polymeric material is irradiated in the inert gas and a peroxide method in which the polymeric material is irradiated under the oxygen existence.

The graft polymerization to the polymeric material is carried out by immersing the polymeric material irradiated under said condition in the vinyl monomer derivatives liquid. It is desirable to use the method in which the polymeric material is immersed in the vinyl monomer derivatives solution diluted with the solvent such as dichloroethane, chloroform, n-methylformamide, n-methylacetamide, n-methylpyrrolidone, γ-butyrolacton, n-hexane, methanol, Ethanol, 1-propanol, t-buthanol, toluene, cyclohexane, cyclohexanone, dimethyl sulfo oxide from the viewpoints of the graft polymerization of the polymeric material and the keeping of the membrane form of the grafted polymeric material in the polymer solution.

In the present invention, the grafting degree to the polymeric material is 5~100 wt %, preferably 30~80 wt %. It is difficult to obtain necessary electric conductivity as a fuel cell in case of 20 wt % or less.

It is possible to thin the thickness of the electrolyte membrane to improve the electric conductivity of the electrolyte membrane by reducing its resistance. However, the electrolyte membrane within the range of 30 μm~200 μm thickness is usually used so that it is susceptible to damages in thinner electrolyte membrane. The thickness of the electrolyte membrane used for the fuel cell of the present is preferably within the range of 5 μm~200 μm.

The anion conducting electrolyte membrane which has weak base quaternary ammonium groups is manufactured by reacting various amines with high basicity with the polymeric material, the raw material of the anion conducting electrolyte membrane, in the present invention.

More concretely, the amines each having different basicity strength are first dissolved in various solvents, and the amine solution is prepared. Next, the polymer membrane, a raw material of the anion conducting electrolyte membrane, is immersed therein. Thereby, the halogenated alkyl groups of the polymer membrane and tertiary amine react, halogen atoms of the halogenated alkyl groups and the tertiary amine are substituted so that the quaternary ammonium groups are introduced. As a result, the anion conducting electrolyte membrane is manufactured.

The strong organic bases each having different basicity strength is, for example, 2-t-butyl-1; 1,3,3-pentamethyl guanidine; 1,1,2,3,3-pentamethyl guanidine; 7-methyl-1,5; 7-triazabicyclo[4.4.0]deca-5-ene; 1,5-diazabicyclo[4.3.0] nona-5-ene; 4-dimethylaminopyridine; 1-methylbenzimidazole; 1,2-dimethylimidazole; 1-methylimidazole; N,N-dimethylaniline; and those derivatives.

In the present invention, a weak base quaternary ammonium salt is formed by the reaction of various strong organic base with high halogenated alkyl group. By setting the weak base quaternary ammonium salts as anion exchange groups in the present invention, the salts of the stable combination of the weak acid and the weak base are formed between the quaternary ammonium and the hydroxide ions which is the weakest acid. In addition, the anion conducting electrolyte membrane with the high conductivity where the electric conductivity and the water uptake are balance can be realize by controlling the basicity of the quaternary ammonium salt by means of the quaternization reaction which uses various strong organic bases.

It is possible to use such strong organic bases alone or use together.

The solvent is alcohols such as methanol, ethanol and propanol, for example ketones such as methyl ethyl ketone. It is possible to use such solvent alone or use together.

Preferably, the density of the tertiary amine solution is, for example, 10~50% by weight.

As for the immersing condition, the immersion time is, for example, 2~48 hours, preferably 24~48 hours, and the immersion temperature is, for example 5° C.~80° C., preferably 10° C.~60° C.

Next, the excessive amine is removed by immersing the anion conducting electrolyte membrane in acid solution or the solution which can solve amine after washing it using pure water. Subsequently, the anion conducting electrolyte membrane is washed using pure water again, and dried under vacuum.

The acid solution is, for example, the inorganic acid solution such as nitric acid, sulfuric acid and hydrochloric acid, or organic acid solution such as formic acid, acetic acid. It is possible to use such solvent alone or use together. Among such acid solution, the inorganic acid solution is preferred. The density of the acid solution is, for example, 0.1 mol/L~5 mol/L, preferably 0.5 mol/L~2 mol/L. As for the density of the solvent, for example, 80% or more is preferable.

The solvent is, for example, ethanol, tetrahydrofuran, toluene, xylene, etc. Among such solution, the solution with high porality is preferred.

The immersion time is, for example. 0.2~48 hours.

The quaternization yield of the anion conducting electrolyte membrane manufactured like this is, for example, 70%~100%.

The anion conducting electrolyte membrane manufactured like this has a halide ion as a counter ion of the quaternary ammonium group. The halide ion can be properly substituted, for example, with a hydroxide ion and a carbonate ion, etc. according to the usage of the anion conducting electrolyte membrane. For example, when the anion conducting electrolyte membrane is used for the solid polymer electrolyte type fuel cell etc., the counter ion is substituted from a halide ion to a hydroxide ion.

The substitution of the halide ion to the hydroxide ion is performed, for example, by immersing the anion conducting electrolyte membrane in the basic solution.

The basic solution is, for example, the solution such as sodium hydroxides, potassium hydroxides. Among such basic solution, potassium hydroxide solution is preferred. The density of the basic solution, for example, 0.1 mol/L~5 mol/L.

It is possible to use such hydroxide solution alone or use together.

As for the immersing condition, the immersion time is, for example, 5~24 hours, and the immersion temperature is, for example, 5° C.~50° C.

In such an anion conducting electrolyte membrane, it is desirable to evaluate all of the membranes in which the hydroxide ion is set as the counter ion. However, the hydroxide ion which is the counter ion is changed into the bicarbonate ion by reacting with carbon dioxide in the atmosphere promptly. Thus, in order to obtain the stable measurement values, the washing after the immersion in the basic solution and the ionic conduction measurement is performed in the degassed water in which the carbon dioxide is removed by nitrogen bubbling.

Each measurement value in the present invention was obtained in the following manner.

(1) Grafting Degree (%)

When the polymeric material is defined as a backbone part and the part where the vinyl monomer is graft-polymerized is defined as a graft part, the weight ratio of the graft part to the backbone part is expressed by the grafting degree ($X_{dg}$ [wt %]) of the following formula.

$$X_{dg}=100(W_1-W_0)/W_0 \quad [\text{FORMULA 1}]$$

Where,
W0: Dry weight before grafting, and
W1: Dry weight after grafting.

(2) Ion Exchange Capacity (mmol/g)

Ion exchange capacity (IEC) of the polymer electrolyte membrane is expressed by the following formula.

$$IEC=[n(\text{basic group})_{obs}]/W_2 \text{ (mmol/g)} \quad [\text{FORMULA 2}]$$

Where,
[n(basic group)$_{obs}$]: basic group amount (mmol) of polymer electrolyte membrane, and
$W_2$: dry weight (g) of polymer electrolyte membrane.

[n(basic group)$_{obs}$] is measured according to the following procedures. The polymer electrolyte membrane of the hydroxide form (hereafter, referred as the OH form) is immersed in 0.1 M hydrochloric acid solution whose capacity is accurately measured at the room temperature for 12 hours and the chloride form (hereafter, referred as the Cl form) is completely made. Then, the basic group density of the polymer electrolyte membrane is obtained by back-titrating the density of the residual hydrochloric acid solution with 0.1 M NaOH.

(3) Quaternization Yield (%)

The quaternization yield of the polymer electrolyte membrane is expressed by the following formula.

$$\text{Quaternization rate}=100\times(W_3/M_{g2})(\text{mol/mol})/(W_1/M_g)(\text{mol/mol}) \quad [\text{FORMULA 3}]$$

Where,
$W_3$: dry weight (g) of membrane after quaternizing,
$M_g$: molecular weight (g/mol) of graft monomer
$M_{g2}$: molecular weight (g/mol) of amine (4) Water Uptake (%)

Weight ($W_5$ (g)) is measured after taking out the polymer electrolyte membrane of the Cl form or the OH form preserved in water under the room temperature, and wiping off lightly water on the surface of the membrane. Dry weight ($W_4$ (g)) of the polymer electrolyte membrane is obtained by measuring the weight ($W_5$ (g)) of the dried membrane after vacuum drying this membrane at 40° C. for 16 hours. The water uptake is calculated by substituting $W_4$ and $W_5$ into the following formula 4.

$$\text{Water uptake}=100(W_5-W_4)/W_4 \quad [\text{FORMULA 4}]$$

(5) Electric Conductivity (S/cm)

Measurement by alternating current process: The membrane resistance measurement cell comprised of the platinum electrode and the LCR meter E-4925A made by Hewlett-Packard were used. After taking out a polymer electrolyte membrane in the state of the saturation swelling in water under the room temperature, placing the membrane between platinum electrodes, and immersing them in the deionized water at 60° C. for 2 minutes, membrane resistance (Rm) by the impedance was measured. The electric conductivity of the polymer electrolyte membrane was calculated by substituting the membrane resistance Rm into the following formula 5.

$$\kappa=1/Rm \cdot d/S \quad [\text{FORMULA 5}]$$

Where,
κ: Electric conductivity (S/cm) of the polymer electrolyte membrane.
d: Thickness (cm) of the polymer electrolyte membrane.
S: electrification area (cm$^2$) of the polymer electrolyte membrane

EMBODIMENT

The following examples are intended to illustrate the invention, but are not to be construed as being limitations thereon.

Embodiment 1

Chloromethylstyrene is graft polymerized on ethylene-tetrafluoroethylene copolymer which became a backbone (70% of the grafting degree) by immersing the membrane in chloromethylstyrene (CMS)/xylene solution (chloromethylstyrene:xylene=1:1) at 60° C. for 2 hours, after irradiating 50 kGy of gamma ray at the room temperature under an argon atmosphere to the ETFE membrane of 50 μm in membrane thickness (made by Asahi Glass Co., Ltd.)

The obtained graft membrane and methyl ethyl ketone solution (10 mole %) of 1-methylimidazole (following chemical formula 1) were put in the screw tube, and they were allowed to react in the thermostatic bath of 60° C. for 42 hours. The anion conducting electrolyte membrane in which a halide ion is a counter ion was obtained at 100% quaternization yield by immersing in 1M hydrochloric acid for 24 hours after washing it with deionized water, then, by immersing in deionized water and washing for 2 hours.

Next, the anion conducting electrolyte membrane in which a hydroxide ion is a counter ion was obtained by immersing for 10 hours in 1M potassium hydroxide after vacuum drying to substitute the counter ion, then washing 3 times using the deionized water in which the carbon dioxide is excluded by nitrogen bubbling, and repeating 3 times 20 minute-shaking operation.

Chemical Formula 1

Embodiment 2

The anion conducting electrolyte membrane was obtained at 99% quaternization yield by performing as in Embodiment 1, except that γ irradiation dose is 50 kGy, immersing time in the solution of CMS:xylene=1:1 is 4 hours, and grafting degree is 80%.

Embodiment 3

The anion conducting electrolyte membrane was obtained at 103% quaternization yield by performing as in Embodiment 1, except that γ irradiation dose is 30 kGy, immersing time in the solution of CMS:xylene=1:1 is 1 hours, and grafting degree is 50%.

Embodiment 4

The anion conducting electrolyte membrane was obtained at 94% quaternization yield by performing as in Embodiment 1, except that the acetone solution (5 mole %) of 1,5-diazabicyclo[4.3.0]nona-5-ene (following chemical formula 2) is used instead of amine solution used in embodiment 1, and the reaction is performed in the thermostat at 50° C. for 16 hours.

Chemical Formula 2

Embodiment 5

The anion conducting electrolyte membrane was obtained at 87% quaternization yield by performing as in Embodiment 1, except that the ethanol solution (10 mole %) of methylbenzimidazole (following chemical formula 3) is used instead of amine solution used in embodiment 1, and the reaction is performed in the thermostat at 60° C. for 42 hours.

Chemical Formula 3

Embodiment 6

The anion conducting electrolyte membrane was obtained at 50% quaternization yield by performing as in Embodiment 1, except that the acetone solution (10 mole %) of 2-t-butyl-1,1,3,3-pentamethylguanidine (following chemical formula 4) is used instead of amine solution used in embodiment 1, and the reaction is performed in the thermostat at 50° C. for 40 hours.

Chemical Formula 4

Comparative Example 1

The anion conducting electrolyte membrane was obtained at 100% quaternization yield by performing as in Embodiment 1, except that 30% trimethylamine solution (following chemical formula 5) is used instead of amine solution used in embodiment 1, and the reaction is performed at the room temperature for 20 hours.

Chemical Formula 5

Comparative Example 2

The anion conducting electrolyte membrane was obtained at 93% quaternization yield by performing as in Embodiment 1, except that the ethanol solution (10 mole %) of 3,3-dimethylbutylamine (following formula 6) is used instead of amine solution used in embodiment 1, and the reaction is performed at the room temperature for 20 hours.

Chemical Formula 6

The quaternization yield in each of the anion conducting electrolyte membrane is roughly 90% or more, and the quaternization reaction has progressed respectively almost quantitatively by optimizing the kind of the solvent, the density of amine and the reaction temperature.

(Evaluation of Electric Conductivity and Water Uptake)

The electric conductivity and the water uptake of each of the anion conducting electrolyte membranes of the Cl form and the OH form manufactured in the present invention were measured, and IEC was calculated about the OH form. The result is shown in Table 1.

TABLE 1

| | Cl-FORM | | OH-FORM | | |
| --- | --- | --- | --- | --- | --- |
| | CONDUCTIVITY (S/cm) | MOISTURE CONTENT (%) | CONDUCTIVITY (S/cm) | MOISTURE CONTENT (%) | IEC (meq/g) |
| EMBODIMENT 1 | 0.041 | 41.2 | 0.127 | 68.1 | 1.77 |
| EMBODIMENT 2 | 0.052 | 47.0 | 0.143 | 72.8 | 1.99 |
| EMBODIMENT 3 | 0.030 | 36.2 | 0.113 | 59.4 | 1.54 |
| EMBODIMENT 4 | 0.028 | 40.9 | 0.024 | 36.6 | 1.69 |
| EMBODIMENT 5 | 0.027 | 32.8 | 0.035 | 23.4 | 1.69 |
| EMBODIMENT 6 | 0.008 | 3.3 | 0.018 | 17.4 | 0.44 |
| COMPARATIVE EXAMPLE | 0.052 | 57.7 | 0.144 | 110 | 1.81 |
| COMPARATIVE EXAMPLE 2 | 0.030 | 40.3 | 0.131 | 105 | 1.67 |

In embodiments 1 to 3 of the anion conducting electrolyte membrane of OH form, the water uptake were from 59.4% to 72.8% and suppressed to about half of the water uptakes 110% and 105% of the comparative examples. And in embodiment 4 to 6, the water uptake was suppressed to about ⅙ to ⅓ of the comparative examples. While, the electric conductivities were 0.113 S/cm to 0.143 S/cm in embodiments 1 to 3, though 0.144 S/cm and 0.131 S/cm in comparative examples. High electric conductivity was exhibited in embodiments 1 to 3 shown though the water uptake was about a half of the comparative example. Further, the electric conductivities were 0.018 S/cm to 0.035 S/cm in embodiments 4 to 6. They exhibited the electric conductivities which are able to be applied to the anion conducting fuel cell though the water uptakes were low.

(Evaluation of Heat Resistance)

Figure 3A:
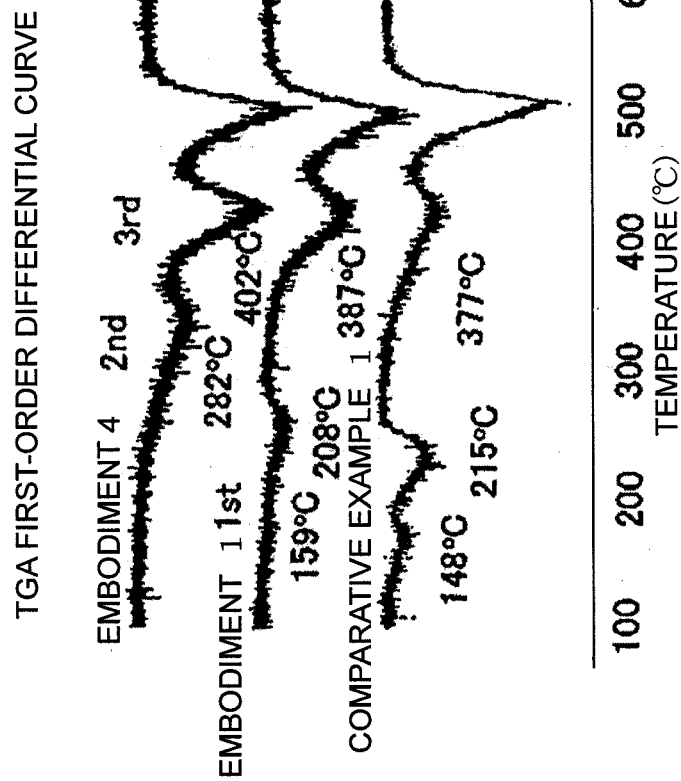
FIGS. 3A and 3B show the results of thermo-gravimetric analysis in hydroxide form of embodiments 1, 4, and comparative example 1 of the present invention.
Figure 3B:
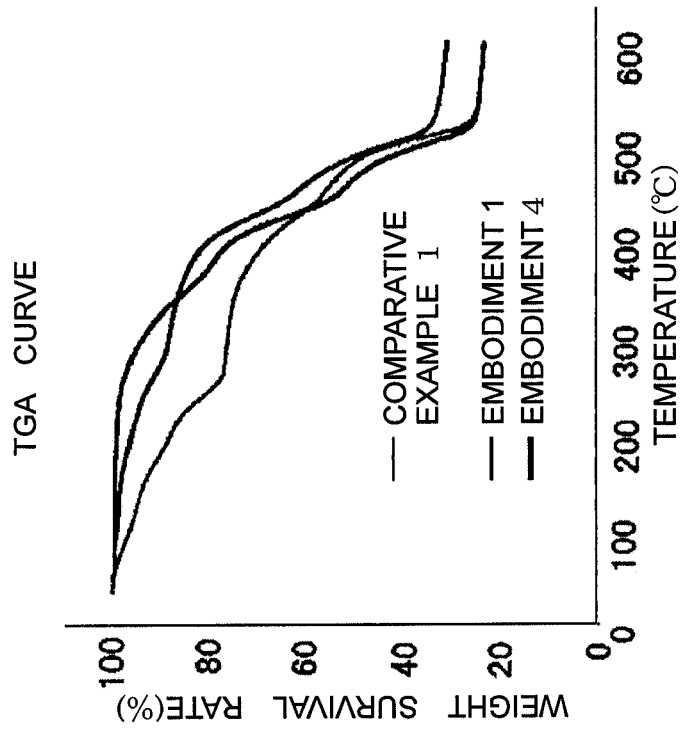

When the durability is estimated in the anion conducting electrolyte membrane, the evaluation of heat resistance becomes an important index. The thermo-gravimetric analysis results of the Cl form and the OH form of the anion conducting electrolyte membranes manufactured in the present invention are shown in FIGS. 3A and 3B. The first pyrolysis temperature in each of the Cl form embodiments 1 and 4 rises more than the comparative example 1, and it is understood that the reduction in weight after the pyrolysis starting temperature is suppressed to low. This tendency appears more remarkably in the OH form, and it is understood that the heat resistance improves remarkably compared with the alkyl amine of comparative example 1 in the imidazole compounds of embodiments 1 to 3 and the strong organic base of embodiment 4.

What is claimed is:
1. A method of manufacturing an anion conducting electrolyte membrane comprising:
   graftpolymerizing a vinyl monomer which contains halogenated alkyl groups attached on a polymeric material which consists of fluorine polymer, olefinic polymer or aromatic polymer using radiation;
   quaternizing at least one part of the grafts attached on the polymeric material introduced by the radiation graftpolymerization with a plurality of strong organic bases, including controlling the basicity of a quaternary salt resulting from the quaternizing with the plurality of strong organic bases; and substituting halogen anions of the quaternized grafts with hydroxide ions.

2. The method of manufacturing an anion conducting electrolyte membrane according to claim 1, wherein said plurality of strong organic bases include at least two selected from the group consisting of 2-t-butyl-1,1,3; 3-pentamethyl guanidine; 1,1,2,3,3-pentamethyl guanidine; 7-methyl-1,5; 7-triazabicyclo[4.4.0]deca-5-ene; 1,5-diazabicyclo[4.3.0]nona-5-ene; 4-dimethylaminopyridine; 1-methylbenzimidazole; 1,2-dimethylimidazole; 1-methylimidazole; and N,N-dimethylaniline.

3. The method of manufacturing an anion conducting electrolyte membrane according to claim 1, wherein said vinyl monomer which contains halogenated alkyl groups is chloromethylstyrene.

4. The method of manufacturing an anion conducting electrolyte membrane according to claim 3, wherein said strong organic bases are each at least one selected from the group consisting of 2-t-butyl-1,1,3; 3-pentamethyl guanidine; 1,1,2,3,3-pentamethyl guanidine; 7-methyl-1,5; 7-triazabicyclo[4.4.0]deca-5-ene; 1,5-diazabicyclo[4.3.0]nona-5-ene; 4-dimethylaminopyridine; 1-methylbenzimidazole; 1,2-dimethylimidazole; 1-methylimidazole; and N,N-dimethylaniline.

5. The method of manufacturing an anion conducting electrolyte membrane according to claim 2, wherein said at least two bases have different respective basicities.

6. The method of manufacturing an anion conducting electrolyte membrane according to claim 1, wherein the controlling includes controlling a balance between electric conductivity and water uptake.

* * * * *